United States Patent [19]

Peck, Jr. et al.

[11] 4,291,456
[45] Sep. 29, 1981

[54] METHOD OF WINDING A COMMUTATOR

[76] Inventors: Kenneth E. Peck, Jr., 20 Oakwood Dr., Pittsboro, N.C. 27312; Donald L. Jordan, Rte. 4, Box 576, Chapel Hill, N.C. 27514

[21] Appl. No.: 128,738

[22] Filed: Mar. 10, 1980

[51] Int. Cl.³ .................. H02K 15/09; H01R 43/08
[52] U.S. Cl. ............................. 29/597; 29/418; 29/423; 310/234; 310/235; 310/236
[58] Field of Search .............. 29/597, 598, 733, 735, 29/418, 423; 310/234, 235, 236

[56] References Cited

U.S. PATENT DOCUMENTS

| | | | |
|---|---|---|---|
| 2,659,959 | 11/1953 | Currivan | 29/735 X |
| 4,052,783 | 10/1977 | Shively | 29/598 X |

Primary Examiner—Carl E. Hall
Attorney, Agent, or Firm—B. B. Olive

[57] ABSTRACT

An armature commutator associated with a slotted core is constructed with a temporary tang structure which is employed during winding on a tang-type winding machine. After the core is wound and the commutator bars are connected, the temporary tang structure is removed resulting in a lead loop-type wound commutator.

5 Claims, 36 Drawing Figures

METHOD OF WINDING A COMMUTATOR

BACKGROUND OF THE INVENTION

1. Field of the Invention:

The invention relates to electric motor armature constructions and methods of winding related thereto.

2. Description of the Prior Art:

Electric motor armature winding typically involves placing and securing the windings in the core slots and making appropriate winding connections to the commutator bars. In the so-called tang method of winding, the commutator is provided with tangs about which the windings are looped prior to being fused to the appropriate commutator bars. Another basic system of winding an armature with a slotted core and a commutator is the lead loop method in which the commutator is formed without tangs. A comparison of the conventional tang method and lead loop method will next be described.

In the tang method of winding, the winding operation starts after the armature and shaft have been assembled with a commutator having the appropriate number of tangs corresponding to the number of commutator bars. The slotted core is then wound with a tang-type winding machine which places the coil ends on the appropriate tangs as part of the coil winding operation. Wedges are placed in the core slots to secure the windings and the tangs are bent and heated which mechanically crimps and electrically connects the coil ends to the respective tangs and also burns away the insulation at the points of connection. The armature is then impregnated with an appropriate insulating material after which the commutator is turned to the finish size.

The tang winding method has a number of advantages as compared to the lead loop winding method. With the tang method, the coil ends are connected mechanically to the commutator bars. There is generally less scrap as compared to the lead loop method. The tang winding method also involves less opportunity for connection errors, provides an armature which is easier to balance than is an armature wound by the lead loop method and generally requires less production time than is required with the lead loop method. However, the tang winding method generally produces an armature with a life expectancy which is less than the life expectancy to be expected from an armature of comparable electrical character wound by the lead loop method. The tang-type winding method also inherently makes connections between the coil ends and the tangs having relatively high electrical resistance. Also, the tangs tend to bend out of alignment and this produces poor electrical connections. The presence of the tangs also tends to increase the overall diameter of the commutator which may be a material disadvantage when a minimum commutator outside diameter is desired and as might be obtained with the lead loop method.

Comparing the lead loop winding method with the tang winding method, the winding operation starts by providing an armature fitted with a slotted core and a shaft but without a commutator. The slotted core is wound with a lead loop-type winder following which the loose coil ends are twisted by the operator around the armature shaft. Wedges are then installed in the armature core slots with a wedge machine after which the operator unwinds and spreads the coil ends. The commutator which is formed without tangs but with individual commutator bar slots is installed on the armature shaft. The leading coil ends are then placed in proper sequence in the individual commutator bar slots and are mechanically staked which mechanically secures the respective coil ends to the respective commutator bars. The staking operation also severs the excess wire on the coil ends which becomes scrap. The respective coil ends are then fused to the respective commutator bars following which it is customary to tie a cord around the lead ends for mechanical support. The wound armature is then impregnated with an appropriate insulating material following which the commutator is turned to the finish size.

Several advantages of the lead loop winding method have been recognized. A more durable and, therefore, an armature with a higher life expectancy, as compared to a tang-type wound armature, is obtained. The fused commutator bar connections introduce less electrical resistance at the commutator bar connections and therefore are to be preferred over the purely mechanical-type electrical connection achieved in the tang-type winding method. The lead loop winding method also allows the outside diameter of the commutator to be reduced by eliminating the tangs. However, there are a number of known disadvantages attributable to the lead loop winding method. The lead loop winder, for example, typically produces scrap at a relatively high rate. A relatively high labor content is also involved in the lead loop winding method because of the added operation associated with handling the loose coil ends after the armature core has been wound and before the commutator bars are connected. The lead loop winding method also inherently introduces a substantial opportunity for connection error and this leads to an increase in the number of armatures that have to be scrapped because of connection errors. Finally, it can be observed that the lead loop winding method inherently requires use of excess wire for the purpose of providing operator identification of the particular coil ends to be connected to the particular commutator bars.

With the above as background, the object of the invention becomes that of providing an armature having a commutator constructed with a temporary tang structure which can be employed during winding so as to preserve all of the advantages of the tang-type winding method and which can be removed after the core has been wound and the commutator bars fused to the appropriate coil ends so as to produce a lead loop-type wound commutator as the end product.

SUMMARY OF THE INVENTION

The armature construction and armature winding method of the invention are based on using an armature having a slotted core and a commutator formed with a temporary tang structure. The temporary tang structure enables the slotted core to be wound and the coil ends placed around the temporary tangs using a conventional tang type winding machine. After the core has been wound, the coil ends are fused to the appropriate commutator bars and the temporary tang structure is removed. In one embodiment of the invention, the temporary tang structure is designed such that it can be removed and discarded during turning of the commutator to its final finish size. In another embodiment, the temporary tang structure is removably mounted on the commutator such that it can be reused.

The armature of the invention is wound with a conventional tang-type winding machine which automatically places the coil windings and coil ends with no human error involved and with a minimum excess end wire. The invention structure and method adapts itself to machine installation of the wedges which hold the windings in the core slots and with virtually no likelihood of breaking wires during the placement of the wedges. The invention construction and method also allows the commutator bars to be fused instead of being mechanically crimped to effect the commutator electrical connections and the coil ends to be severed during the fusing operation. The relatively long life and durability of the lead loop-type wound armature are both achieved. Use of the tang-type winding method with the temporary tang structure of the invention also leads to a reduction in scrap, a reduction in labor content, a reduction in the opportunity for human error associated with armature winding, a reduction in the opportunity for wedge damage and a reduction in the amount of wire consumed. Further, an armature wound according to the invention has the advantge of being relatively easy to balance as with an armature wound by the conventional tang winding method.

DESCRIPTION OF THE PREFERRED EMBODIMENT

Figure 12:
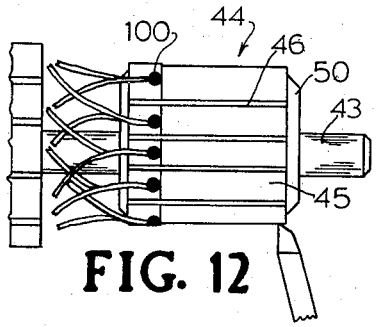
FIG. 12 is a fragmentary side elevation view of the finished armature structure after the lathe operation.
Figure 13:
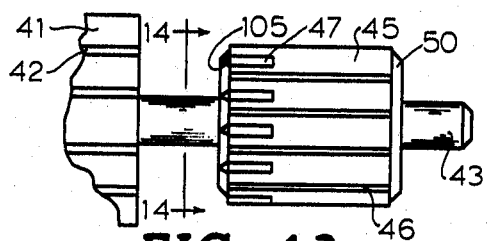
FIG. 13 is a fragmentary side elevation view of an armature utilizing a lead loop-type commutator with notches formed at the ends of the commutator bars as an aid in winding when employing the temporary tang structure of the invention.
Figure 14:
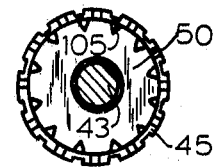
FIG. 14 is a section view taken substantially along line 14—14 of FIG. 13 to better illustrate the notched type lead loop commutator.

As previously stated, all of the embodiments of the invention illustrated in the drawings are directed to providing an armature of the type having a slotted core with a commutator structure provided with temporary winding tangs associated with the commutator bars such that the armature can be wound with a tang-type winding machine and following fusing of the coil ends to the commutator bars the temporary tangs can be removed so as to produce a lead loop-type commutator structure. There are basically two forms of the invention illustrated. The preferred form of the invention shown in FIGS. 1-12 provides a temporary tang structure which can be placed on the commutator during winding and then removed and reused. FIGS. 13-14 illustrate a variation of the first form of the invention in which additional notches are provided in the commutator hub to facilitate placement and fusing of the coil ends to the commutator bars.

The second basic form of the invention is directed to providing a temporary tang structure associated with the commutator and which is purposely designed to be removed and discarded as part of the commutator finishing operation. FIGS. 15-29 are directed to the discardable temporary tang structure in which the temporary tangs are molded out of the same material used to mold the hub of the commutator and are then removed in a lathe operation after winding and fusing of the coil ends to the commutator bars. FIGS. 30-36 are also directed to the discardable type of temporary tang structure but are directed to a temporary tang structure which can be formed out of the same copper material of which the commutator bars are formed and then discarded in the final commutator finishing operation.

Figure 1:
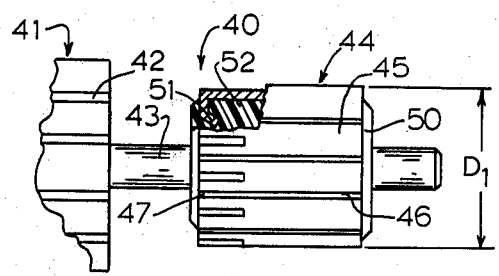
FIG. 1 is a fragmentary side elevation view of an armature with a slotted armature core and a lead loop-type commutator mounted on the armature shaft preparatory to being employed with a reusable and temporary commutator tang structure according to a preferred and first embodiment of the invention with a twelve bar commutator being used by way of example.
Figure 2:
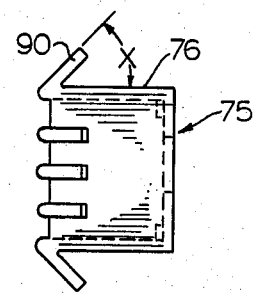
FIG. 2 is a side elevation view of a reusable temporary tang structure designed for use with the lead loop-type commutator illustrated in FIG. 1.
Figure 3:
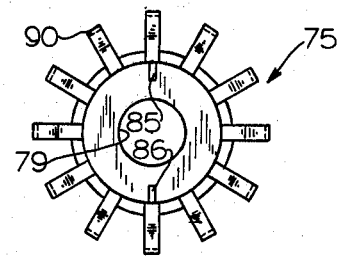
FIG. 3 is a left end view of the temporary tang structure of FIG. 2.
Figure 4:
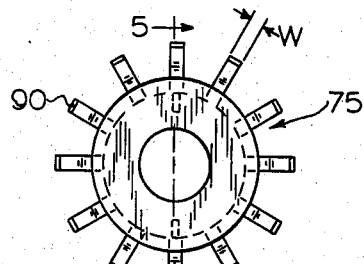
FIG. 4 is a right end view of the temporary tang structure of FIG. 2.
Figure 5:
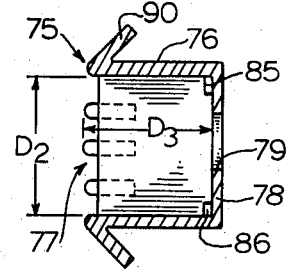
FIG. 5 is a section view taken substantially along line 5—5 of FIG. 4.

Referring initially to FIG. 1, there is illustrated a conventional armature 40 having a core 41 which slots 42 and shown mounted on armature shaft 43. Associated with the slotted core 41 there is also illustrated a conventional commutator 44 formed as a lead loop-type commutator bars 45 electrically and physically separated by slots 46. Additional recesses for slots 47 which partially penetrate the thickness of the commutator bars are also provided to assist in placement and fusing of the coil ends after winding to the respective commutator bars 45. The commutator bars 45 are held in the molded hub 50 by means of inwardly turned tangs or prongs 51 secured in the insulating plastic material 52. Since the type of armature construction which has just been described in reference to FIG. 1 is well known to those skilled in the art, the description will next proceed to a discussion of how the temporary winding tang structure is formed, how it is applied to the commutator illustrated in FIG. 1 and then how it is removed so that it may be reused on another commutator such as illustrated in FIG. 1.

Figure 7:
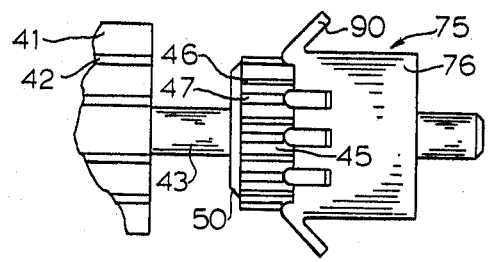
FIG. 7 is a view similar to FIG. 6 showing the temporary tang structure mounted on the commutator.

Referring initially to FIGS. 2-5, the reusable temporary tang structure 75 comprises a cup-shaped body portion 76 with an open front end 77 adapted to receive commutator 44 and having a closed end wall 78 with an opening 79 for receiving shaft 43. A pair of internal oppositely-disposed guide members 85, 86 are adapted to be received in a corresponding pair of commutator bar separator slots 46 when the temporary tang structure 75 is installed on the commutator 44 as shown in FIG. 7. Of special importance to the invention is the presence of peripherally-spaced winding tangs 90 corresponding in number to the number of commutator bars, a twelve commutator bar arrangement being used by way of example. It is the set of temporary tangs 90 which enable the lead loop-type commutator 44, illustrated in FIG. 1, to be used in association with a conventional tang-type winding machine and tang-type winding method, for example, as illustrated in U.S. Pat. No. 3,585,716. It will also be noted that the winding tangs 90 are formed at an appropriate angle X and with sufficient width W appropriate to the winding operation and to the choice of material employed in making the reusable temporary tang support structure 75. For example, the temporary tang support structure 75 may be molded of a suitable material or may be cast in a metallic form.

Figure 6:
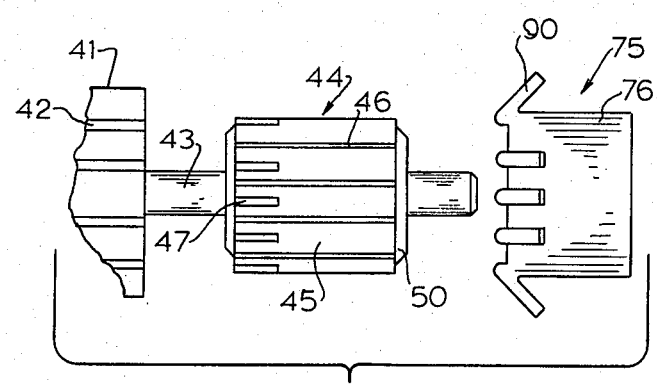
FIG. 6 is an exploded, fragmentary, side elevation view of the core, commutator and shaft of FIG. 1 with the temporary tang structure of FIG. 2 about to be placed on the commutator.

In use, the temporary tang support structure 75 is aligned with the commutator 44 as in FIG. 6 and so that the guide members 85, 86 mate with an appropriate pair of commutator bar separator slots 46 as previously explained. Also, the respective commutator diameter D1 and internal diameter D2 of the tang support structure 75 are mated so that the tang support structure 75 fits on commutator 44 in a relatively snug fit. Also, the dimension D3 is selected such that the temporary tang support structure 75 will assume, when installed on armature 44, the position indicated in FIG. 7.

Figure 8:
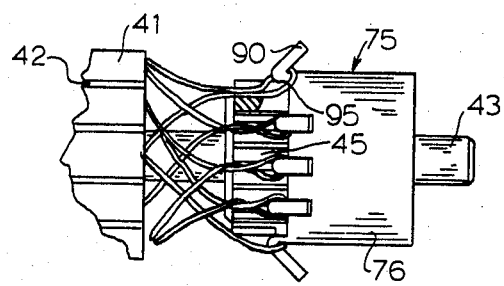
FIG. 8 is a view similar to FIG. 7 after the commutator has been wound on a tang-type winding machine using the temporary tang structure of the invention and illustrating an alpha pattern by way of example.
Figure 9:
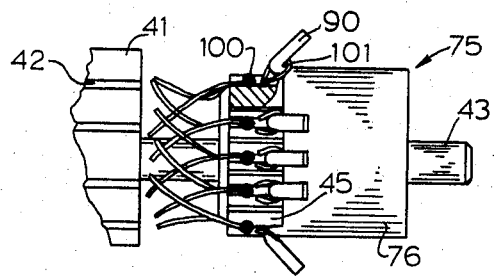
FIG. 9 is a view similar to FIG. 8 after fusing of the coil ends to the commutator bars and illustrating severing of the excess coil ends as part of the fusing operation.
Figure 10:
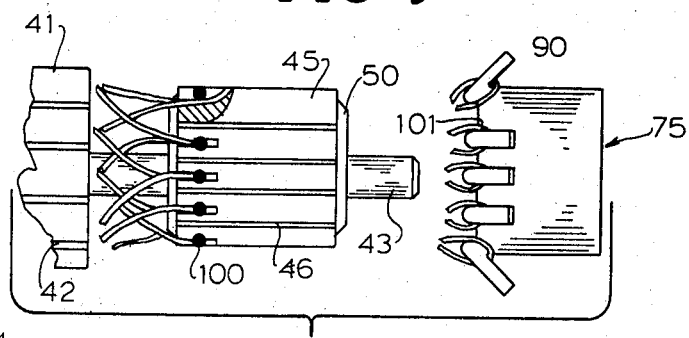
FIG. 10 is a view similar to FIG. 9 but with the temporary tang structure of the invention shown removed from the commutator and with the now-severed excess coil ends loosely supported on the temporary tangs prior to being removed from the temporary tang structure.

Once the temporary tang support structure 75 has been appropriately installed on commutator 44 as in FIG. 7, a conventional tang-type winding machine and method can then be employed to cause the coil ends 95 to be looped around the respective temporary tangs 90 with an alpha pattern being illustrated by way of example in FIG. 8. Following the conventional tang winding step as in FIG. 8, the portions of the coil wires immediately in front of the respective tangs 90 are pressed into the wire guide recesses 47 and joined to the respective commutator bars by fuse points 100. Since the fusing technique and method is well known in the armature winding art, it will be readily understood that the fusing operation illustrated in FIG. 9 also acts to separate the excess coil loops 101 shown in FIG. 9 such that following the fusing operation the temporary tang support structure 75 can be readily slipped off and completely removed from commutator 44 as illustrated in FIG. 10. In order to complete the armature 40 the commutator 44 is now turned to its finished size as illustrated in FIG. 12 to produce a lead loop-type wound armature as in FIG. 11.

In order to enhance the placement of the coil ends during the winding operation, the invention also recognizes that for some applications, depending on the flexibility, gauge of wire and winding pattern being employed, it may be desirable to provide additional notches 105 at the outer ends of the wire receiving recesses 47 as illustrated in FIGS. 13 and 14.

Figure 11:
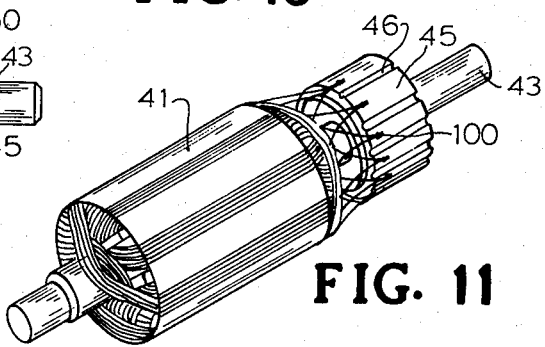
FIG. 11 is a prospective view of the wound armature after the temporary tang structure has been removed and immediately prior to the lathe finishing operation.

From what has been thus far described, it will be appreciated that the temporary tang structure 75 enables the armature 40 to be automatically wound and to achieve all of the advantages associated with the tang winding method and tang-type winding machinery. The end result, however, is a lead loop-type wound commutator, as best illustrated in FIGS. 10 and 11. Thus, all of the advantages of the lead loop wound-type commutator are also retained. A further significant advantage of the temporary tang structure 75 is that it is in a form adapted to be reused. Because of the fact that such temporary tang structure can be reused, it also follows that the temporary tang structue 75 can be made from the most durable material because of the ability to amortize the cost over a long life and extremely large production of motors such as might employ the wound armature 40 of FIG. 11.

Having now described and explained the reusable form of the temporary tang structure of the invention, the description will next proceed to another form of the invention in which the temporary tang structure is purposely designed as a discardable device and for a single end use. Two forms of the discardable form of the invention will be discussed. One discardable type of temporary tang structure is based on molding the temporary tangs out of the same molded material of which the commutator hub is formed. This discardable form of temporary tang structure is illustrated in FIGS. 16–29. Another discardable form of temporary tang structure is based on forming the temporary tangs out of the same copper material of which the commutator bars are formed. This latter form of the invention is illustrated in reference to FIGS. 30–36.

Figure 15:
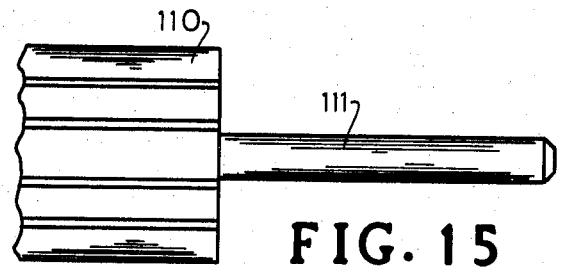
FIG. 15 is a side elevation view of an armature having a slotted core and armature shaft as employed with a single use temporary tang structure according to a second embodiment of the invention.
Figure 16:
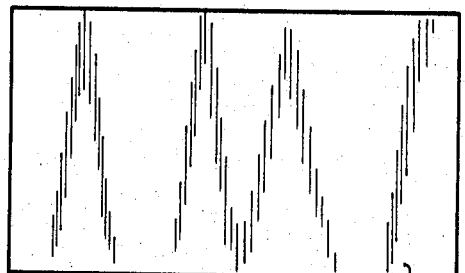
FIG. 16 illustrates in a plan view of a rectangular sheet of copper the first step in forming the commutator of the second embodiment.
Figure 17:
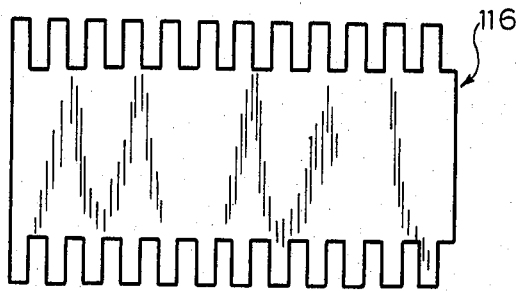
FIG. 17 illustrates the FIG. 16 sheet of material after being knotched.
Figure 18:
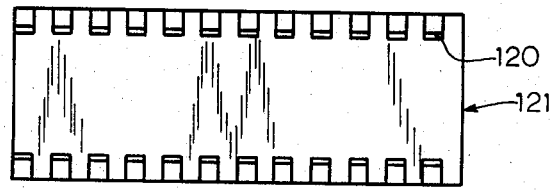
FIG. 18 is a plan view of the FIG. 17 sheet of material after a bending operation providing a set of internal tangs for each commutator bar location.
Figure 19:
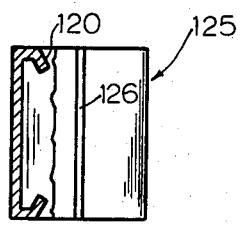
FIG. 19 is a partially cutaway side elevation view of the FIG. 18 sheet of material rolled into the tubular form of the commutator of the second embodiment of the invention.

The discardable form of temporary tang structure differs from the reusable form of temporary tang structure in that the forming of the discardable temporary tang structure becomes part of the forming of the commutator. Thus, there is first provided a slotted armature core 110 having an armature shaft 111 but without a commutator mounted thereon as illustrated in FIG. 15. For comparison, it will be noted that FIG. 1 illustrates a conventional lead loop-type formed commutator already assembled on the armature shaft. To follow the steps associated with forming the discardable type of commutator, FIG. 16 represents a rectangulr sheet 115 of copper material. The length, width and thickness of sheet 115 will, of course, be selected dependent on the number of commutator bars to be formed and the length and width of such bars, all of which will become clear as the description proceeds. The rectangular sheet 115 is then notched to provide the notched sheet 116 following which the prongs 120 are formed to provide the pronged sheet 121. The pronged sheet 121 is then rolled into a tubular form 125 having a single slot 126 which from later description will be understood as comprising one of the slots separating the commutator bars formed from the tubular form 125.

Figure 24:
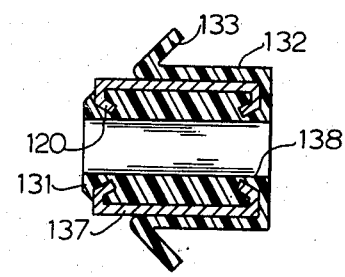
FIG. 24 is a section view taken substantially along line 24—24 of FIG. 23.
Figure 25:
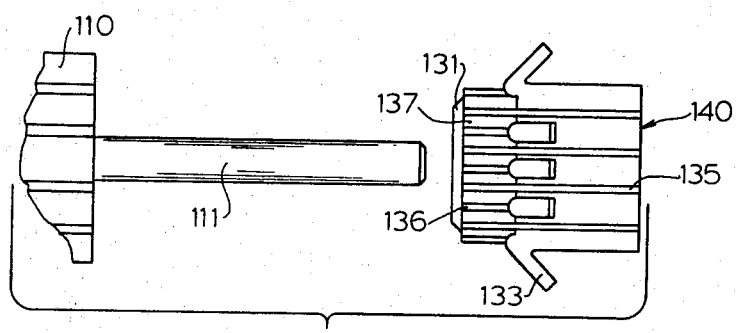
FIG. 25 is an exploded fragmentary side elevation view of the armature core and shaft with the FIG. 21 commutator assembly about to be placed on the shaft.

In the next operation, the tubular commutator form 125 is inserted in a suitable molding machine and is associated with a molded structure 130 providing an inner commutator hub 131 and an outer cylindrical shell portion 132 formed with an integral set of temporary winding tangs 133. During the molding operation, the internal prongs 120 become embedded in the internal molded hub portion 131 as best illustrated in FIG. 24. The forming of commutators having hubs of molded rigid insulating material and in which the individual commutator bars are secured within the molded material by internal prongs, comparable to prongs 120, constitutes in itself a well-known practice. This part of the manufacturing operation being explained will, thus, be quickly understood by those skilled in the art. Those skilled in the art will also readily appreciate that by using a conventional molding techniques, both the hub portion 131 as well as the outer temporary tang support structure 132 can be molded as an integral structure as also illustrated in FIG. 24.

Figure 20:
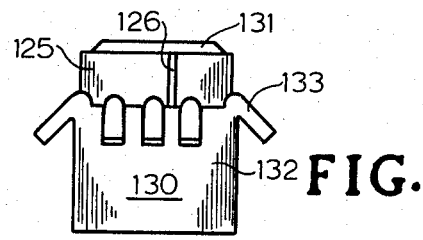
FIG. 20 is a side elevation view of the commutator tube form of FIG. 19 as it appears after being combined with a tubular molded structure forming an internal hub for the commutator and an external set of temporary wire support tangs according to the second embodiment of the invention.
Figure 21:
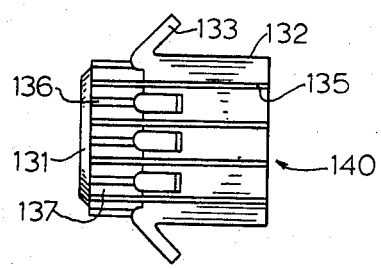
FIG. 21 is a side elevation view of the FIG. 20 structure after a slotting operation defining the commutator bars and a wire receiving slot immediately in front of each temporary tang.
Figure 22:
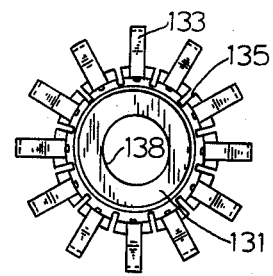
FIG. 22 is a left end view of the FIG. 21 commutator.
Figure 23:
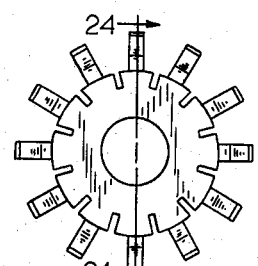
FIG. 23 is a right end view of the FIG. 21 commutator.

Following the molding operation illustrated in FIG. 20, an additional number of slots 135 are made and are sufficiently deep so as to penetrate the thickness of the temporary tang support shell 132 as well as the thickness of the copper sheet comprising the tubular commutator form 125. This slotting operation illustrated in FIG. 1 thus establishes the individual commutator bars with twelve such commutator bars being used by way of example. Additional coil end receiving recesses 136 are also formed to provide the composite commutator-temporary tang support structure 140 shown being fitted on the armature shaft 111 in FIG. 25 and assembled on the armature shaft 111 in FIG. 26.

At this point in the description, it should be appreciated that the composite commutator-temporary tang structure 140 is essentially equivalent for purposes of using the tang winding method and tang winding machinery to the combination provided by the commutator 44 and the reusable temporary tang structure 75 illustrated in FIG. 7. The principal difference, of course, being that the temporary tang support structure 75 is designed to be reusable whereas the temporary tang support structure 130 forming part of the composite commutator-temporary tang structure 140 is intended to be discarded after a single use.

Figure 26:
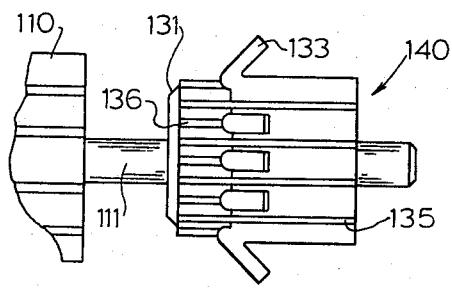
FIG. 26 is a view similar to FIG. 25 with the commutator assembly mounted on the shaft.
Figure 27:
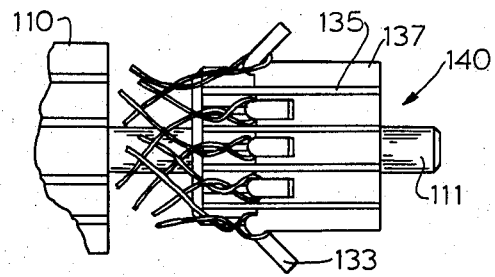
FIG. 27 illustrates the commutator assembly of FIG. 26 after it has been wound with an alpha pattern being used by way of example.
Figure 28:
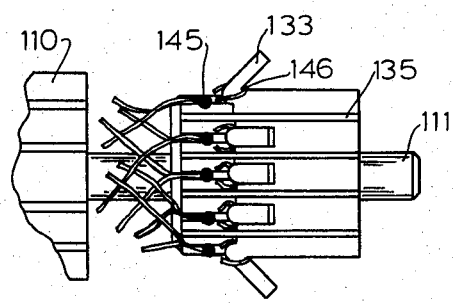
FIG. 28 illustrates the commutator assembly of FIG. 27 after fusing of the coil ends to the commutator bars and illustrating how the coil ends on the temporary tangs are severed in the process of fusing.
Figure 29:
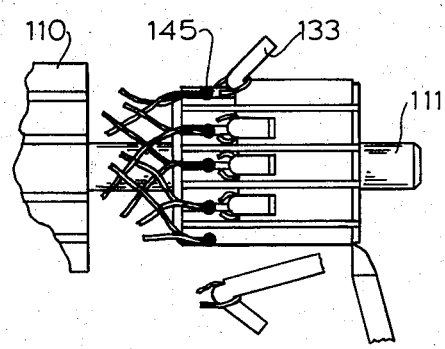
FIG. 29 illustrates a lathe turning operation on the commutator assembly of FIG. 28 which removes the temporary molded tang support structure and turns the commutator to its finished size.

The composite commutator-temporary tang structure 140 after being installed on the armature shaft 111 as illustrated in FIG. 26 is then wound utilizing the tang-type winding method and conventional automatic tang-type winding machine as illustrated in FIG. 27 with an alpha pattern being used by way of example. In the next operation, the coil ends are fused at fuse points 145 and simultaneously the excess looped coil ends 146 around the temporary tangs 133 are severed in the course of the fusing operation. It will, of course, be understood that in the event the invention structure and method is applied to motors utilizing extremely heavy gauge wire, it may be necessary to actually sever or cut the excess coil ends 146 in a specific cutting operation. Following the fusing and coil end severing operation depicted in FIG. 28, the temporary outer shell portion 132 and temporary tangs 133 are removed in a lathe finishing operation illustrated in FIG. 29 which may also be employed to reduce the commutator to its final finished size with the end product being as previously illustrated in connection with FIG. 11.

Figure 30:
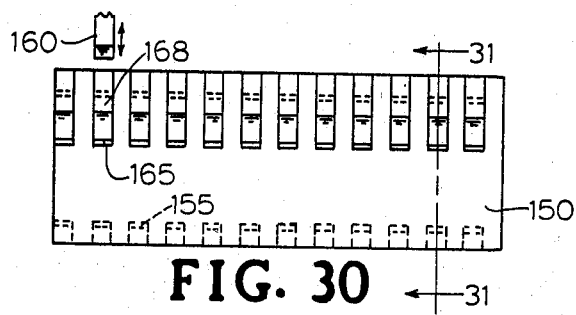
FIG. 30 illustrates an alternative skiving operation on the formed copper plate of FIG. 18 enabling external removable temporary tangs to be formed as well as internal commutator bar securing tangs out of the copper sheet.
Figure 31:
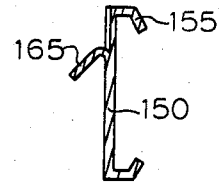
FIG. 31 is a section view taken substantially on line 31—31 of FIG. 30.
Figure 32:
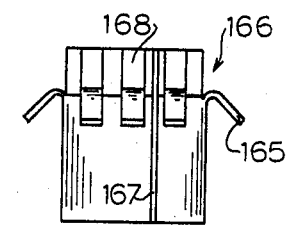
FIG. 32 is a side elevation view of the FIG. 30 sheet of copper in a tubular form following the skiving operation.
Figure 33:
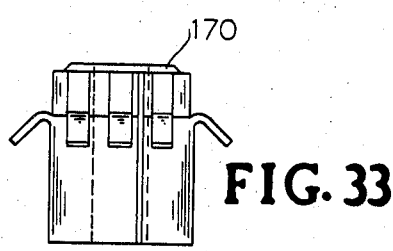
FIG. 33 is a side elevation view of the FIG. 32 commutator structure after being associated with a molded inner hub portion.

The forming of the temporary tang structure out of the same material of which the commutator hub is formed is illustrated in FIG. 24 and obviously has many advantages. However, the invention also recognizes that a discardable tang structure can be formed out of the same copper material of which the commutator bars are formed. FIG. 30 thus illustrates a rectangular sheet 150 having previously formed prongs 155 which will be understood as being comparable to the previously-discussed prongs 120 of FIGS. 18 and 19. In a skiving operation, an appropriate skiving tool 160 is employed on the side of sheet 150 opposite the location of the securing prongs 155 in a manner designed to provide a set of temporary tangs 165. After sheet 150 has been formed with the appropriate number of temporary tangs 165 corresponding to the desired number of commutator bars, sheet 150 is then rolled into the tubular form 166 shown in FIG. 32 and having the single slot 167 which later becomes one of the slots utilized to separate a pair of the commutator bars. A molding operation is then employed to form an internal molded hub 170 as shown in FIG. 33. The additional slots 171 are then made to establish the respective number of commutator bars 175 and additionally a coil end receiving recess 176 is formed immediately in front of each temporary tang 165.

Figure 34:
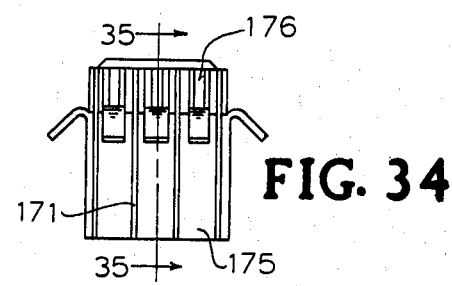
FIG. 34 represents the composite structure of FIG. 33 after slots have been formed to define the commutator bars and also to provide a wire receiving slot immediately in front of each temporary tang.
Figure 35:
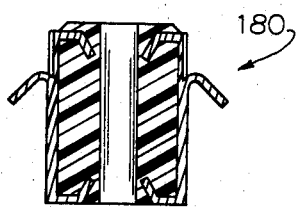
FIG. 35 is a section view taken substantially along line 35—35 of FIG. 34.
Figure 36:
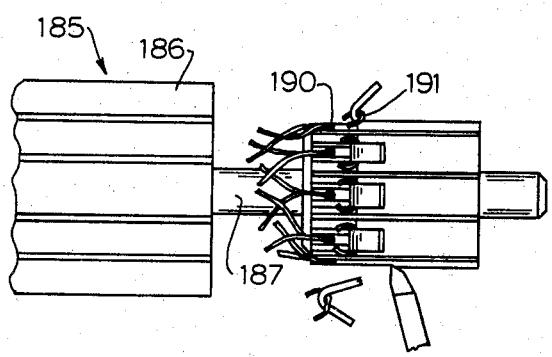
FIG. 36 is a side elevation view of the commutator assembly of FIG. 35 as it appears assembled on the armature shaft, after the winding and coil end fusing operation and illustrating how the commutator is brought to finish size and the temporary tangs and excess coil ends removed in a single lathe operation.

Following the formation of the composite commutator-temporary tang structure 180, illustrated in FIGS. 34 and 35, such composite structure 180 is fitted on the armature 185 having the slotted core 186 and shaft 187 in the manner illustrated in FIG. 36. There then follows a fusing operation establishing the fuse points 190 and acting to sever the excess coil ends 191 as further illustrated in FIG. 36. Following the fusing and coil end severing operation, the commutator 195 is then turned to its finished size as further illustrated in FIG. 36 and in such turning operation the temporary tangs 165 are removed as also illustrated in FIG. 36. Since the winding, fusing and turning operations generally follow operations previously explained, it is believed those skilled in the art will readily appreciate how the armature 185 is reduced to the same finished form previously illustrated in connection with FIG. 11 thereby achieving a lead loop-type wound armature.

From the foregoing description, it can be seen that the invention allows the armature core and associated commutator to be wound with a tang-type winder and according to the tang-type winding method. Such procedure thus causes the coil ends to be automatically placed and retained without involving human error and with no excess end wire formed. While not illustrated, it will also be appreciated that the conventional wedges can be machine installed in the core slots and with no likelihood of breaking wires during such wedge installation procedure. Another significant advantage is obtained by having fused connection points between the coil ends and the commutator bars so as to substantially reduce the electrical resistance as compared to the typical mechanical crimped connection associated with the typical tang-type winding method. Also, an armature wound according to the invention construction and method can be impregnated according to conventional practices. With the reusable type of temporary tang structure, the invention contemplates that such temporary type structure would be removed prior to impregnation whereas with the discardable type of temporary tang structure the invention contemplates that the impregnation step would be performed prior to removing and discarding the temporary tang structure.

Among other advantages it will also be seen that the temporary tang structure provides positive means for holding the lead loop ends during the automatic winding operation. The durability characteristic of the lead loop-type commutator is achieved. Scrap material due to human errors is substantially reduced. The labor content is minimized. There is overall a substantial reduction in opportunity for human error, less opportunity for wedge damage and the end armature product lends itself to being relatively easy to balance.

What is claimed is:

1. In a method of automatically winding armatures wherein armatures are wound and commutator connections are formed at a winding station utilizing an automatic tang-type winding machine adapted to loop the coil ends around tangs associated with the commutator bars, the steps of:
    (a) forming the commutator with electrically isolated bars and an associated set of winding tangs formed in a manner enabling the same to be removed after winding and without impairing the commutator connections;
    (b) winding the armature with an automatic tang-type winding machine and in the course of winding looping selected coil end wires on selected tangs according to the tang-type winding method;
    (c) electrically connecting the said coil end wires to the corresponding commutator bars;
    (d) severing those portions of the coil end wires on the tangs from the corresponding electrical connections on the commutator bars; and
    (e) removing the tangs from the commutator thereby leaving a lead loop-type connected commutator.

2. The method of claim 1 wherein said tangs are formed as part of a reusable tang structure adapted to be mounted on the commutator during winding of the armature and then removed therefrom for reuse on an unwound armature.

3. The method of claim 1 wherein said tangs are formed as part of a discardable, single end use structure adapted to be used on the commutator during winding and then physically destroyed during separation from said commutator following said winding.

4. The method of claim 3 wherein said tangs are formed as part of an integral structure molded of a plastic electrically insulating material integral with a hub portion of said commutator.

5. The method of claim 3 wherein said tangs are formed of material obtained from the stock employed to form said commutator bars and in a form adapted for separation from said bars after the winding of said armature.

* * * * *

UNITED STATES PATENT AND TRADEMARK OFFICE
CERTIFICATE OF CORRECTION

PATENT NO. : 4,291,456
DATED : September 29, 1981
INVENTOR(S) : Kenneth E. Peck, Jr. et al.

It is certified that error appears in the above—identified patent and that said Letters Patent is hereby corrected as shown below:

Col. 3, line 61, "prospective" should be --perspective--.

Col. 4, line 14, "knotched" should be --notched--.

Col. 5, line 49, "which" should be --with--.

Col. 5, line 52, after "loop-type" insert --commutator with--.

Col. 7, line 43, "rectangulr" should be --rectangular--.

Signed and Sealed this

Twenty-third Day of March 1982

[SEAL]

Attest:

GERALD J. MOSSINGHOFF

Attesting Officer

Commissioner of Patents and Trademarks